(12) United States Patent
Do et al.

(10) Patent No.: US 12,113,217 B2
(45) Date of Patent: Oct. 8, 2024

(54) CATHODE ACTIVE MATERIAL FOR LITHIUM SECONDARY BATTERY AND LITHIUM SECONDARY BATTERY INCLUDING THE SAME

(71) Applicants: SK INNOVATION CO., LTD., Seoul (KR); SK ON CO., LTD., Seoul (KR)

(72) Inventors: Ji Yae Do, Daejeon (KR); Min Suk Kang, Daejeon (KR); Min Cheol Beak, Daejeon (KR); Kwang Ho Lee, Daejeon (KR); Wan Uk Choi, Daejeon (KR)

(73) Assignees: SK INNOVATION CO., LTD., Seoul (KR); SK ON CO., LTD., Seoul (KR)

( * ) Notice: Subject to any disclaimer, the term of this patent is extended or adjusted under 35 U.S.C. 154(b) by 0 days.

(21) Appl. No.: 18/501,932

(22) Filed: Nov. 3, 2023

(65) Prior Publication Data
US 2024/0154118 A1    May 9, 2024

(30) Foreign Application Priority Data
Nov. 8, 2022 (KR) .................. 10-2022-0148163

(51) Int. Cl.
| | |
|---|---|
| *H01M 4/58* | (2010.01) |
| *C01B 25/45* | (2006.01) |
| *H01M 4/131* | (2010.01) |
| *H01M 10/052* | (2010.01) |
| *H01M 4/02* | (2006.01) |

(52) U.S. Cl.
CPC ........ *H01M 4/5825* (2013.01); *C01B 25/45* (2013.01); *H01M 4/131* (2013.01); *H01M 10/052* (2013.01); *C01P 2002/54* (2013.01); *C01P 2002/60* (2013.01); *C01P 2002/72* (2013.01); *C01P 2006/40* (2013.01); *H01M 2004/021* (2013.01); *H01M 2004/028* (2013.01)

(58) Field of Classification Search
None
See application file for complete search history.

(56) References Cited

FOREIGN PATENT DOCUMENTS

| | | |
|---|---|---|
| CN | 102694199 A | 9/2012 |
| EP | 3995455 A1 | 5/2022 |
| JP | 2009-218205 A | 9/2009 |

(Continued)

OTHER PUBLICATIONS

Office Action for Korean Patent Application No. 10-2022-0148163, mailed Nov. 15, 2023 (10 pages).

(Continued)

*Primary Examiner* — Carlos Barcena
(74) *Attorney, Agent, or Firm* — Perkins Coie LLP

(57) ABSTRACT

Cathode active materials for lithium secondary batteries and lithium secondary batteries including the cathode active materials are disclosed. In some implementations, a cathode active material for a lithium secondary battery includes a lithium metal phosphate particle having a crystallite size in a range from 150 nm to 450 nm in a direction of a crystallographic plane (020) as measured by an X-ray diffraction (XRD) analysis. In some implementations, a lithium secondary battery includes a cathode including a cathode active material layer that includes a cathode active material for a lithium secondary battery, and an anode facing the cathode. In some implementations, an electrode crystallite size ratio defined by Equation 4 is in a range from 0.5 to 0.9.

12 Claims, 1 Drawing Sheet

(56) References Cited

FOREIGN PATENT DOCUMENTS

| | | |
|---|---|---|
| JP | 2016-143503 A | 8/2016 |
| JP | 2018-014321 A | 1/2018 |
| JP | 2019-149356 A | 9/2019 |
| KR | 10-2012-0021183 A | 3/2012 |
| KR | 10-2012-0106622 A | 9/2012 |
| KR | 10-2017-0093085 A | 8/2017 |
| KR | 10-2021-0122020 A | 10/2021 |
| KR | 10-2022-0040889 A | 3/2022 |
| KR | 10-2022-0062974 A | 5/2022 |

OTHER PUBLICATIONS

Decision on Registration for Korean Patent Application No. 10-2022-0148163, mailed Feb. 24, 2024 (6 pages).

Ferrari, S. et al., "Influence of Particle Size and Crystal Orientation on the Electrochemical Behavior of Carbon-Coated LiFeP04," J. Phys. Chem. C 2010, 114, 12598-12603 (6 pages).

Database WPIWeek 200968 Thomson Scientific, London, GB;AN 2009-N93039-& JP 2009 218205 A (GS Yuasa Corp) Sep. 24, 2009 (2 pages).

Kiyoshi, K. et al., "Hydrothermal synthesis of LifePO4 as a cathode material for lithium batteries," J Mater Sci (2008) 43:2138-2142 (5 pages).

Huang, C. et al., "LiFePO4 Crystal Growth during Co-precipitation," Int. J. Electrochem. Sci., 11 (2016) 754-762 ( 9 pages).

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This patent document claims the priority and benefits of Korean Patent Application No. 10-2022-0148163 filed on Nov. 8, 2022, the entire disclosure of which is incorporated herein by reference.

TECHNICAL FIELD

The technology and implementations disclosed in this patent document generally relate to a cathode active material for a lithium secondary battery and a lithium secondary battery including the same.

BACKGROUND

The rapid growth of electric vehicles and portable devices, such as camcorders, mobile phones, and laptop computers, has brought increasing demands for secondary batteries, which can be charged and discharged repeatedly. Recently, a battery pack including the secondary battery is being developed and applied as an eco-friendly power source of an electric automobile, a hybrid vehicle, etc.

SUMMARY

In an aspect of the disclosed technology, there is provided a cathode active material for a lithium secondary battery having improved low-temperature stability and operational reliability.

In an aspect of the disclosed technology, a lithium secondary battery may include a cathode active material for a lithium secondary battery with improved low-temperature stability and operational reliability.

In some embodiments, a cathode active material for a lithium secondary battery includes a lithium metal phosphate particle having a crystallite size in a range from 150 nm to 450 nm in a direction of a crystallographic plane (020) s measured by an X-ray diffraction (XRD) analysis. In some implementations, the direction of a plane may include any direction on the plane in which ions can move through a crystalline lattice of the lithium metal phosphate particle.

In some embodiments, the crystallite size of the lithium metal phosphate particle in the direction of the crystallographic plane (020) may be in a range from 250 nm to 400 nm.

In some embodiments, the crystallite size of the lithium metal phosphate particle in the direction of the crystallographic plane (020) may be measured using Equation 1 below.

$$Lp(020) = \frac{0.9\lambda}{\beta\cos\theta} \quad \text{[Equation 1]}$$

In Equation 1, $Lp(020)$ is the crystallite size (nm) of the lithium metal phosphate particle in the direction of the crystallographic plane (020), $\lambda$ is an X-ray wavelength (nm), $\beta$ is a full width at half maximum (FWHM) (rad) of a peak corresponding to the crystallographic plane (020), and $\theta$ is a diffraction angle (rad).

In some embodiments, a particle crystallite size ratio measured by an XRD analysis and defined by Equation 2 is greater than 0 and less than 1.

$$\text{particle crystallite size ratio} = Lp(020)/Lp(200) \quad \text{[Equation 2]}$$

In Equation 2, $Lp(020)$ is the crystallite size (nm) in the direction of the crystallographic plane (020) of the lithium metal phosphate particle, and $Lp(200)$ is a crystallite size (nm) in a direction of the crystallographic plane (020) of the lithium metal phosphate particle.

In some embodiments, $Lp(200)$ of Equation 2 may be measured using Equation 3.

$$Lp(200) = \frac{0.9\lambda}{\beta\cos\theta} \quad \text{[Equation 3]}$$

In Equation 3, $Lp(200)$ is the crystallite size (nm) of the lithium metal phosphate particle in the direction of the crystallographic plane (200), $\lambda$ is an X-ray wavelength (nm), $\beta$ is a full width at half maximum (rad) of a peak corresponding to the crystallographic plane (200), and $\theta$ is a diffraction angle (rad).

In some embodiments, the particle crystallite size ratio may be in a range from 0.80 to 0.99.

In some embodiments, the lithium metal phosphate particle may include an olivine crystal structure represented by Chemical Formula 1.

$$Li_aM_xP_yO_{4+z} \quad \text{[Chemical Formula 1]}$$

In Chemical Formula 1, $0.9 \leq a \leq 1.2$, $0.99 \leq x \leq 1.01$, $0.9 \leq y \leq 1.2$, $-0.1 \leq z \leq 0.1$, and M includes at least one selected from the group consisting of Fe, Co, Ni and Mn.

In some embodiments, the lithium metal phosphate particle may further include a doping element or a coating element, and the doping element or the coating element may include at least one selected from the group consisting of Na, Mg, Ca, Y, Ti, Hf, V, Nb, Ta, Cr, Mo, W, Fe, Cu, Ag, Zn, B, Al, Ga, C, Si, Sn, Sr, Ba, Ra, P and Zr.

In some embodiments, the lithium metal phosphate particle may further include a carbon coating formed on a surface thereof.

In some embodiments, the direction of the crystallographic plane (020) of the lithium metal phosphate particle is a direction in which lithium ions are diffused or transferred.

A lithium secondary battery includes a cathode including a cathode active material layer that includes a cathode active material for a lithium secondary battery, and an anode facing the cathode. An electrode crystallite size ratio defined by Equation 4 is in a range from 0.5 to 0.9.

$$\text{electrode crystallite size ratio} = Le(020)/Le(200) \quad \text{[Equation 4]}$$

In Equation 4, $Le(020)$ is a crystallite size (nm) in a direction of a crystallographic plane (020) measured by an XRD analysis on the cathode active material layer, and $Le(200)$ is a crystallite size (nm) in a direction of a crystallographic plane (200) direction measured by the XRD analysis on the cathode active material layer.

In some embodiments, $Le(020)$ of Equation may be measured using Equation 5, and $Le(200)$ may be measured using Equation 6.

$$Le(020) = \frac{0.9\lambda}{\beta\cos\theta} \quad \text{[Equation 5]}$$

-continued $$Le(200) = \frac{0.9\lambda}{\beta \cos\theta}$$ [Equation 6]

In Equation 5, Le(020) is the crystallite grain size (nm) in the direction of the crystallographic plane (020) measured by the XRD analysis on the cathode active material layer, λ is an X-ray wavelength (nm), β is a full width at half maximum (rad) of a peak corresponding to the crystallographic plane (020) measured by the XRD analysis on the cathode active material layer, and θ is a diffraction angle (rad). In Equation 6, Le(200) is the crystallite grain size (nm) in the direction of the crystallographic plane (200) measured by the XRD analysis on the cathode active material layer, λ is an X-ray wavelength (nm), β is a full width at half maximum (rad) of a peak corresponding to the crystallographic plane (200) measured by the XRD analysis on the cathode active material layer, and θ is a diffraction angle (rad).

In some embodiments, Le(020) in Equation 4 may be in a range from 120 nm to 370 nm.

In some embodiments, a lithium secondary battery may include an anode; and a cathode including a cathode active material that includes a lithium metal phosphate particle having a lattice structure to allow lithium ions to move from or to an electrolyte disposed between the anode and the cathode through the lattice structure of the lithium metal phosphate particle, wherein a crystallite size of the lithium metal phosphate particle obtained by performing an X-ray diffraction (XRD) analysis in a direction of a crystallographic plane (020) of the lattice structure of the lithium metal phosphate particle is in a range from 150 nm to 450 nm.

A cathode active material for a lithium secondary battery according to embodiments of the disclosed technology includes lithium metal phosphate particles.

In example embodiments, a crystallite size of the lithium metal phosphate particles in a direction of a crystallographic plane (020) measured through am X-ray diffraction (XRD) analysis may be adjusted within a desired range. Accordingly, a diffusion distance of lithium ions may be reduced, and power properties and an energy density at low temperature may be improved. Additionally, process efficiency may be improved and an excessive increase of a specific surface area may be suppressed.

In some embodiments, a ratio of the crystallite size of the lithium metal phosphate particles in the direction of the crystallographic plane (020) relative to a crystallite size in a crystallographic plane (200) direction measured by the XRD analysis may be controlled within a desired range. Accordingly, a discharge capacity and the energy density at low temperature may be improved while maintaining structural stability of the lithium metal phosphate particles.

The cathode active material and the lithium secondary battery of the disclosed technology may be widely applied in green technology fields such as an electric vehicle, a battery charging station, solar power generation wind power generation using other batteries, etc. The cathode active material for a lithium secondary battery and the lithium secondary battery according to the disclosed technology may be used for eco-friendly electric vehicles and hybrid vehicles to prevent a climate change by suppressing air pollution and greenhouse gas emissions, etc.

DETAILED DESCRIPTION

Figure 1:
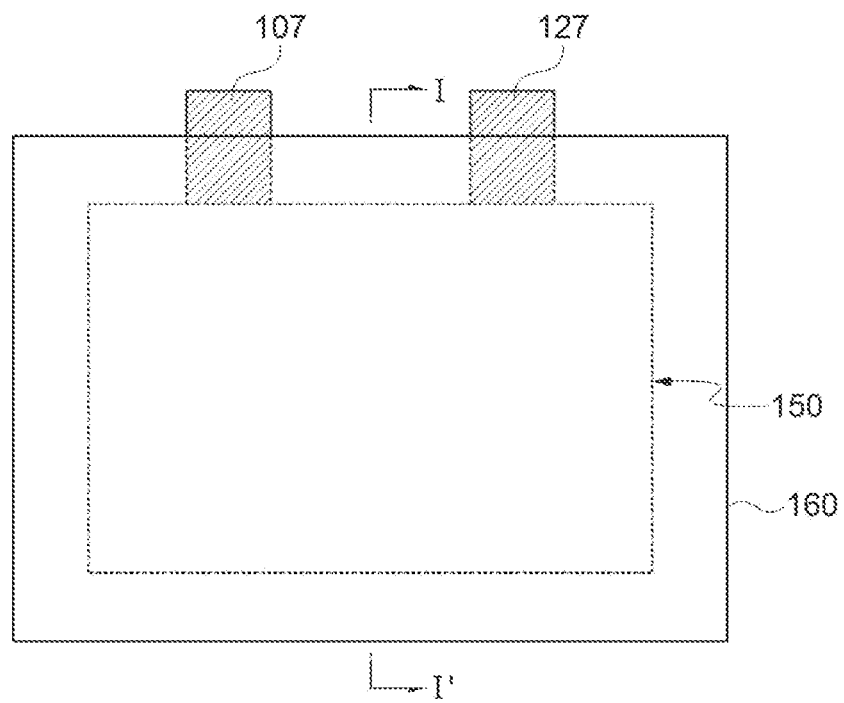
FIG. 1 is a schematic plan view illustrating a lithium secondary battery based on some embodiments of the disclosed technology.

Section headings are used in the present document only for ease of understanding and do not limit scope of the embodiments to the section in which they are described.

The disclosed technology can be implemented in some embodiments to provide a cathode active material for a secondary battery such as a lithium secondary battery including a lithium metal phosphate particle. In some embodiments of the disclosed technology, a secondary battery such as a lithium secondary battery includes the cathode active material.

Examples of secondary battery include lithium secondary batteries, nickel-cadmium batteries, nickel-hydrogen batteries. Lithium secondary batteries are used in various applications due to their high operational voltage and energy density per unit weight, high charging rate, and compact dimension. In some implementations, a secondary battery can include a cathode, an anode, and an electrolyte, and cathode materials are the main components of the lithium secondary battery. For example, a lithium metal phosphate may be used as a cathode active material of the lithium secondary battery.

The wide application range of the lithium secondary batteries brings the need for lithium secondary batteries having higher capacity, longer life-span and higher energy density. However, the low ionic conductivity of the lithium metal phosphate may deteriorate a low-temperature performance of the lithium secondary batteries.

In some example embodiments, a cathode active material for a lithium secondary battery includes a lithium metal phosphate particle. In some implementations, the term "cathode active material" can be used to indicate a cathode active material forming a cathode in a lithium secondary battery.

In some example embodiments, the lithium metal phosphate particle constituting the cathode active material for the lithium secondary battery may have a crystallite size ranging from 150 nm to 450 nm in a crystallographic plane (020) direction when measured by an X-ray diffraction (XRD) analysis. In some embodiments, the crystallite size may be in a range from 250 nm to 400 nm, or from 300 nm to 350 nm.

For example, the direction of the crystallographic plane (020) of the lithium metal phosphate particle may be a direction in which lithium ions may be diffused or transferred. In some implementations, the direction of a plane may include any direction on the plane in which ions can move through a crystalline lattice of the lithium metal phosphate particle. As the crystallite size in the direction of the crystallographic plane (020) decreases, a transfer distance of the lithium ions become shortened, and thus power properties of the lithium secondary battery and an energy density at low temperature may be improved.

For example, if the crystallite size of the lithium metal phosphate particle in the direction of the crystallographic plane (020) is less than 150 nm, a particle diameter of the lithium metal phosphate particle becomes excessively small, resulting in a reduction of process efficiency and an excessive increase of a Brunauer-Emmett-Teller (BET) specific surface area of the lithium metal phosphate particle. Accordingly, side reactions between the cathode active material and an electrolyte may be increased.

For example, if the crystallite size of the lithium metal phosphate particle in the crystallographic plane (200) direction exceeds 450 nm, the diffusion distance of the lithium ions may be excessively increased. Accordingly, a discharge capacity and the energy density at low temperature may decrease because a transfer speed of the lithium ions decreases at low temperature.

In some embodiments, the crystallite size of the lithium metal phosphate particle in the direction of the crystallographic plane (020) may be measured using a Scherrer equation represented by Equation 1 below in the XRD analysis.

$$Lp(020) = \frac{0.9\lambda}{\beta\cos\theta}$$ [Equation 1]

In Equation 1, Lp(020) is the crystallite size (nm) in the direction of the crystallographic plane (020) of the lithium metal phosphate particle, $\lambda$ is an X-ray wavelength (nm), and $\beta$ is a full width at half maximum (FWHM) of a peak corresponding to the crystallographic plane (020) of the lithium metal phosphate particle, and $\theta$ is a diffraction angle (rad).

For example, in Equation 1, $\beta$ may be a full width at half maximum from which a device-derived value is corrected.

In some embodiments, a crystallite size ratio measured by the XRD analysis and defined by Equation 2 below may be greater than 0 and less than 1, and may be in a range from 0.80 to 0.99 in some embodiments.

Crystallite size ratio=$Lp(020)/Lp(200)$ [Equation 2]

In Equation 2, Lp(020) is the crystallite size (nm) of the lithium metal phosphate particle in the crystallographic plane (020) direction, and Lp(200) is a crystallite size (nm) of the lithium metal phosphate particle in a crystallographic plane (200) direction.

For example, Lp(020) may be the crystallite size in a direction in which the lithium ions may be diffused or transferred, and Lp(200) may be the crystallite size in a direction perpendicular to the direction in which the lithium ions may be diffused or transferred.

Within the particle size ratio range, structural stability and process efficiency of the lithium metal phosphate particles may be maintained or improved while reducing the diffusion distance of the lithium ions. Thus, the discharge capacity and the energy density at low temperature may be enhanced.

In some embodiments, the crystallite size of the lithium metal phosphate particle in the crystallographic plane (200) direction may be measured through the Scherrer equation represented by Equation 3 below in the XRD analysis.

$$Lp(200) = \frac{0.9\lambda}{\beta\cos\theta}$$ [Equation 3]

In Equation 3, Lp(200) is the crystallite size (nm) in the crystallographic plane (200) direction of the lithium metal phosphate particle, $\lambda$ is an X-ray wavelength (nm), and $\beta$ is a full width at half maximum of a peak corresponding to the crystallographic plane (200) of the lithium metal phosphate particle, and $\theta$ is a diffraction angle (rad).

For example, in Equation 3, R may be a full width at half maximum from which a device-derived value is corrected.

In some embodiments, the lithium metal phosphate particle may include a carbon coating formed thereon. Accordingly, electrical conductivity may be improved to also enhance the power properties of the cathode active material.

For example, Lp(020) and Lp(200) of Equations 1 to 3 may be measured by performing the XRD analysis on a powder of the lithium metal phosphate particles.

In some embodiments, the lithium metal phosphate particle may include an olivine crystal structure represented by Chemical Formula 1 below.

$Li_aM_xP_yO_{4+z}$ [Chemical Formula 1]

In Chemical Formula 1, $0.9 \leq a \leq 1.2$, $0.99 \leq x \leq 1.01$, $0.9 \leq y \leq 1.2$, $-0.1 \leq z \leq 0.1$, and M may include at least one selected from the group consisting of Fe, Co, Ni, and Mn.

The chemical structure represented by Chemical Formula 1 indicates a bonding relationship included in the olivine crystal structure of the cathode active material and is not intended to exclude other additional elements. For example, M includes Fe, Co, Ni, and/or Mn, and Fe, Co, Ni, and/or Mn may serve as a main active element of the cathode active material. Chemical Formula 1 is provided to express the bonding relationship of the main active elements and is to be understood as a formula encompassing introduction and substitution of an additional element.

In an embodiment, an auxiliary element for enhancing chemical stability of the cathode active material or the olivine crystal structure may be further included in addition to the main active element. The auxiliary element may be incorporated into the olivine crystal structure to form a bond, and it is to be understood that this structure is also included within the chemical structure represented by Chemical Formula 1.

For example, the auxiliary element may include at least one selected from the group consisting of Na, Mg, Ca, Y, Ti, Hf, V, Nb, Ta, Cr, Mo, W, Fe, Cu, Ag, Zn, B, Al, Ga, C, Si, Sn, Sr, Ba, Ra, P and Zr. The auxiliary element may act as an auxiliary active element (e.g., Al) that may contribute to capacity/power activity of the cathode active material together with Fe, Co, Ni, or Mn.

For example, the cathode active material or the lithium metal phosphate particle may include an olivine crystal structure represented by Chemical Formula 1-1 below.

$Li_aM1_xM2_yP_zO_{4+b}$ [Chemical Formula 1-1]

In Chemical Formula 1-1, $0.98 \leq a \leq 1.56$, $0.99 \leq x \leq 1.01$, $0 \leq y \leq 0.05$, $0.86 \leq z \leq 1.2$, $-0.1 \leq b \leq 0.1$. In Chemical Formula 1-1, M1 may include at least one selected from the group consisting of Fe, Co, Ni, and Mn. In Chemical Formula 1-1, M2 may include at least one selected from the group consisting of Na, Mg, Ca, Y, Ti, Hf, V, Nb, Ta, Cr, Mo, W, Fe, Cu, Ag, Zn, B, Al, Ga, C, Si, Sn, Sr, Ba, Ra, P and Zr.

The cathode active material or the lithium metal phosphate particle may further include a coating element or a doping element. For example, an element substantially the same as or similar to the above-mentioned auxiliary element may be used as the coating element or the doping element. For example, one of the above elements or a combination of two or more may be used as the coating element or the doping element.

For example, M2 in Chemical Formula 1-1 may serve as the coating element or the doping element.

The coating element or the doping element may be present on a surface of the lithium metal phosphate particle or may be penetrated through the surface of the lithium metal phosphate particle to be included in the bonding structure represented by Chemical Formula 1 or Chemical Formula 1-1.

In an embodiment, the lithium metal phosphate particle may include $LiFePO_4$.

For example, when forming the lithium metal phosphate particle, a lithium source (e.g., lithium carbonate), an iron phosphate and a carbon source (e.g., glucose) may be added to distilled water and mixed using a ball mill to pulverize the particles to a target size.

Distilled water may be evaporated by drying (e.g., a spray drying) the mixed solution containing the pulverized particles.

Lithium metal phosphate may be formed by calcining the dried particles at a temperature from about 300° C. to 1000° C. for about 3 hours to 10 hours under a nitrogen atmosphere, and then performing classification and de-iron processes. The time and temperature of the calcination may be adjusted to control the crystallite size of the lithium metal phosphate particle in the crystallographic plane (020) direction and the crystallographic plane (200) direction. Accordingly, the lithium metal phosphate particles satisfying the crystallite size in the direction of the crystallographic plane (020) and the crystallite size ratio as described above may be formed.

The above-described cathode active material described above may include a plurality of the lithium metal phosphate particles. A content of the lithium metal phosphate particles based on a total weight of the cathode active material may be 50 wt % or more, 60 wt % or more, 70 wt % or more, 80 wt % or more, or 90 wt % or more.

In some embodiments, the cathode active material may further include a different type of active material particles together with the lithium metal phosphate particles. For example, the cathode active material may further include a lithium-nickel-cobalt-manganese (Li-NCM)-based active material particle, a lithium nickel-aluminum (LNA)-based active material particle, a lithium-nickel-manganese (LNM)-based active material particle, etc.

In some embodiments, the cathode active material may substantially consist of the lithium metal phosphate particles.

Figure 2:
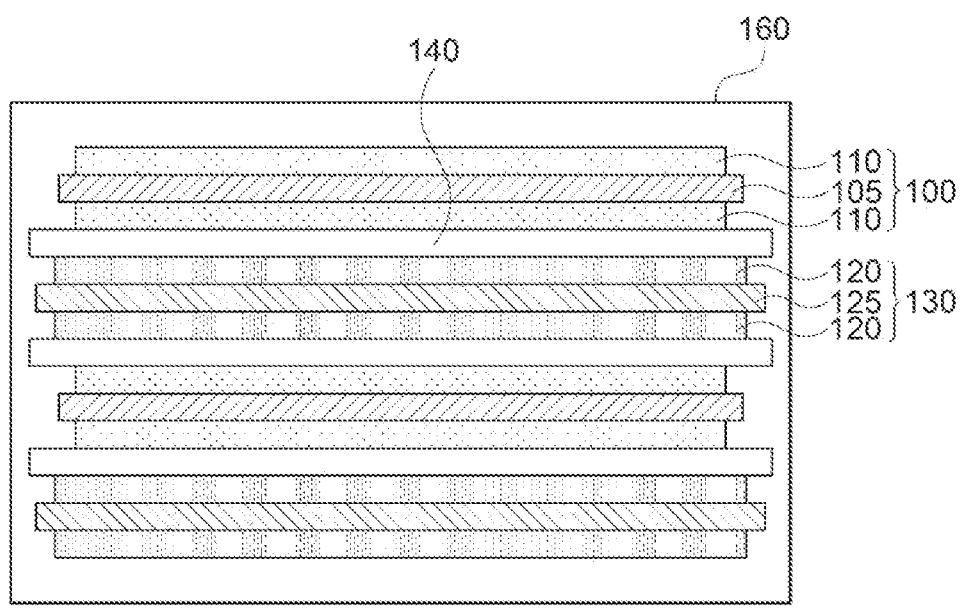
FIG. 2 is a schematic cross-sectional view illustrating a lithium secondary battery based on some embodiments of the disclosed technology.

FIG. 1 is a schematic plan view illustrating a lithium secondary battery based on some embodiments of the disclosed technology. FIG. 2 is a schematic cross-sectional view illustrating a lithium secondary battery based on some embodiments of the disclosed technology. For example, FIG. 2 is a cross-sectional view taken along a line I-I' of FIG. 1 in a thickness direction.

Referring to FIGS. 1 and 2, the lithium secondary battery may include a cathode 100 including the above-described lithium metal phosphate particle as the cathode active material and an anode 130 facing the cathode 100.

The cathode 100 may include a cathode active material layer 110 formed by coating the above-described cathode active material on a cathode current collector 105.

For example, the cathode active material may be mixed and stirred in a solvent together with a binder, a conductive material and/or a dispersive agent to form a cathode slurry. The cathode slurry may be coated on at least one surface of the cathode current collector 105, and then dried and pressed to form the cathode 100.

The cathode current collector 105 may include stainless steel, nickel, aluminum, titanium, or an alloy thereof. The cathode current collector 105 may include aluminum or stainless steel surface-treated with carbon, nickel, titanium or silver. For example, a thickness of the cathode current collector 105 may be in a range from 10 m to 50 km.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material may be relatively increased. Thus, capacity and power of the secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

In example embodiments, an electrode crystallite size ratio defined by Equation 4 below may be obtained by performing an XRD analysis on the cathode active material layer 110.

For example, the electrode crystallite size ratio defined by Equation 4 below may be in a range from 0.5 to 0.9, and may be in a range from 0.65 to 0.8 in some embodiments.

$$\text{Electrode crystallite size ratio} = Le(020)/Le(200) \quad \text{[Equation 4]}$$

In Equation 4, $Le(020)$ is a crystallite size (nm) in the crystallographic plane (020) direction measured by the XRD analysis on the cathode active material layer, and $Le(200)$ is a crystallite size (nm) in the crystallographic plane (200) direction measured by the XRD analysis on the cathode active material layer.

Within the range of the electrode crystallite size ratio, the structural stability and process efficiency of lithium metal phosphate particles may be maintained or improved while reducing the diffusion distance of the lithium ions. Accordingly, the discharge capacity and the energy density at low temperature may be improved.

In some embodiments, $Le(020)$ of Equation 4 may be measured by Equation 5 below, and $Le(200)$ may be measured by Equation 6 below.

$$Le(020) = \frac{0.9\lambda}{\beta \cos\theta} \quad \text{[Equation 5]}$$

$$Le(200) = \frac{0.9\lambda}{\beta \cos\theta} \quad \text{[Equation 6]}$$

In Equation 5, $Le(020)$ is the crystallite size (nm) in the crystallographic plane (020) direction measured by the XRD analysis on the cathode active material layer 110, $\lambda$ is an X-ray wavelength (nm), and $\beta$ is a full width at half maximum of a peak corresponding to the crystallographic plane (020) measured by the XRD analysis on the cathode active material layer 110, and $\theta$ is a diffraction angle (rad).

In Equation 6, $Le(200)$ is the crystallite size (nm) in the crystallographic plane (200) direction measured by the XRD analysis on the cathode active material layer, $\lambda$ is an X-ray wavelength (nm), and $\beta$ is a full width at half maximum of a peak corresponding to the crystallographic plane (200) measured by the XRD analysis on the cathode active material layer 110, and $\theta$ is a diffraction angle (rad).

In some embodiments, $Le(020)$ of Equation 4 may be in a range from 120 nm to 370 nm, and may be in a range from 135 nm to 300 nm in some embodiments. Within this range, side reactions between the cathode and the electrolyte may be suppressed, and the capacity and energy density low-temperature may be improved.

For example, Le(020) and Le(200) of Equations 4 to 6 may be measured by performing the XRD analysis on the cathode active material layer 110 included in the cathode 100.

The anode 130 may include an anode current collector 125 and an anode active material layer 120 formed by coating an anode active material on at least one surface of the anode current collector 125.

The anode active material may include a material capable of adsorbing and ejecting lithium ions. For example, a carbon-based material such as a crystalline carbon, an amorphous carbon, a carbon complex or a carbon fiber, a lithium alloy, silicon or tin may be used as the anode active material.

The amorphous carbon may include, e.g., a hard carbon, coke, a mesocarbon microbead (MCMB) fired at a temperature of 1500° C. or less, a mesophase pitch-based carbon fiber (MPCF), etc. The crystalline carbon may include a graphite-based material such as natural graphite, graphitized coke, graphitized MCMB, graphitized MPCF, etc. The lithium alloy may further include aluminum, zinc, bismuth, cadmium, antimony, silicon, lead, tin, gallium, indium, etc.

For example, the anode current collector 125 may include a copper foil, a nickel foil, a stainless steel foil, a titanium foil, a nickel foam, a copper foam or a polymer substrate coated with a conductive metal. These may be used alone or in combination thereof. For example, a thickness of the anode current collector 125 may be in a range from 10 μm to 50 μm.

In some embodiments, a slurry may be formed by mixing and stirring the negative electrode active material with a binder, a conductive material, and/or a dispersive agent in a solvent. The slurry may be coated on the negative electrode current collector, and then dried and pressed to form the negative electrode 130.

The binder and the conductive material substantially the same as or similar to those used for the cathode active material layer 110 may be used in the anode 130. In some embodiments, the binder for forming the anode 130 may include an aqueous binder such as styrene-butadiene rubber (SBR) for a compatibility with, e.g., the carbon-based active material, and carboxymethyl cellulose (CMC) may also be used as a thickener.

In some embodiments, a separation layer 140 may be interposed between the cathode 100 and the anode 130. The separation layer 140 may include a porous polymer film formed from, e.g., a polyolefin-based polymer such as an ethylene homopolymer, a propylene homopolymer, an ethylene/butene copolymer, an ethylene/hexene copolymer, an ethylene/methacrylate copolymer, etc. The separation layer 140 may also include a non-woven fabric formed from a glass fiber with a high melting point, a polyethylene terephthalate fiber, or the like.

In example embodiments, an electrode cell may be defined by the cathode 100, the anode 130 and the separation layer 140, and a plurality of the electrode cells may be stacked to form an electrode assembly 150 that may have e.g., a jelly roll shape. For example, the electrode assembly 150 may be formed by stacking, z-folding, stack-folding of the separation layer 140.

The electrode assembly 150 may be accommodated together with an electrolyte in an outer case 160 to define the lithium secondary battery. In example embodiments, a non-aqueous electrolyte may be used as the electrolyte.

The non-aqueous electrolyte may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

In some embodiments, a solid electrolyte may be used instead of the above-mentioned non-aqueous electrolyte. In this case, the lithium secondary battery may be manufactured in the form of an all-solid-state battery. Further, a solid electrolyte layer may be disposed between the anode 100 and the cathode 130 instead of the above-mentioned separation layer 140.

The solid electrolyte may include a sulfide-based electrolyte. Non-limiting examples of the sulfide-based electrolyte may include $Li_2S$—$P_2S_5$, $Li_2S$—$P_2S_5$—$LiCl$, $Li_2S$—$P_2S_5$—$LiBr$, $Li_2S$—$P_2S_5$—$LiCl$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (m and n are positive numbers, and Z is Ge, Zn or Ga), $Li_2S$—$GeS_2$, $Li_2S$—$SiS_2$—$Li_3PO_4$, $Li_2S$—$SiS_2$-$Li_pMO_q$, (p and q are positive numbers, M is P, Si, Ge, B, Al, Ga or In), $Li_7$-$xPS_6$-$xCl_x$ ($0 \le x \le 2$), $Li_7$-$xPS_6$-$xBr_x$ ($0 \le x \le 2$), $Li_7$-$xPS_6$-$xI_x$ ($0 \le x \le 2$), etc. These may be used alone or in a combination thereof.

In an embodiment, the solid electrolyte may include, e.g., an oxide-based amorphous solid electrolyte such as $Li_2O$—$B_2O_3$—$P_2O_5$, $Li_2O$—$SiO_2$, $Li_2O$—$B_2O_3$, $Li_2O$—$B_2O_3$—$ZnO$, etc.

As illustrated in FIG. 1, electrode tabs (a cathode tab and an anode tab) may protrude from the cathode current collector 105 and the anode current collector 125 included in each electrode cell to one side of the case 160. The electrode tabs may be welded together with the one side of the case 160 to be connected to an electrode lead (a cathode lead 107 and an anode lead 127) that may be extended or exposed to an outside of the case 160.

The lithium secondary battery may be manufactured in, e.g., a cylindrical shape using a can, a square shape, a pouch shape or a coin shape.

Hereinafter, embodiments of the disclosed technology are described in more detail with reference to experimental examples. However, the following examples are only given for illustrating the present invention and those skilled in the related art will obviously understand that various alterations and modifications are possible within the scope and spirit of the present invention. Such alterations and modifications are duly included in the appended claims.

Examples 1 to 6 and Comparative Examples 1 to 4

Preparation of Cathode Active Material

Lithium carbonate as a lithium source, iron phosphate, and glucose as a carbon coating source were put in distilled water, and the particles were mixed and pulverized using a ball mill to form a mixed solution containing LiFePO$_4$.

The formed LiFePO$_4$-containing mixed solution was dried using a micro-nozzle type spray dryer.

The dried powder was calcined at a temperature in a range from about 300° C. to 1000° C. for about 3 hours to 10 hours under a nitrogen atmosphere, and then subjected to classification and de-iron processes to prepare lithium metal phosphate particles.

Lithium metal phosphate particles having different crystallite sizes and crystallite size ratios in the crystallographic plane (020) direction were prepared while controlling temperature and time of the calcination. Thereafter, particles having the crystallite size and the crystallite size ratio as shown in Table 2 from a result of an XRD analysis were selected among the prepared lithium metal phosphate particles, and used as cathode active materials according to Examples 1 to 6 and Comparative Examples 1 to 4.

Fabrication of Lithium Secondary Battery

A lithium secondary battery was manufactured using the prepared cathode active material. Specifically, the prepared cathode active material, Denka Black as a conductive material and PVDF as a binder were mixed in a mass ratio of 93:5:2, respectively, to form a cathode slurry. The cathode slurry was coated on an aluminum current collector, dried and pressed to from a cathode including a cathode active material layer. A target electrode density of the cathode after the pressing was adjusted to 2.45 g/cc.

Lithium metal was used as an anode active material.

The cathode and the anode prepared as described above were notched and stacked in a circular shape having diameters of Φ14 and Φ16, respectively, and a separator (polyethylene, thickness 13 μm) notched by a dimension of Φ19 was interposed between the cathode and the anode to form an electrode cell. The electrode cell was placed in a coin cell casing having a diameter of 20 mm and a height of 1.6 mm, an electrolyte was injected and assembled, and then aged for 12 hours or more so that the electrodes were impregnated with the electrolyte.

A 1M LiPF$_6$ solution prepared using a mixed solvent of EC/EMC (30/70; volume ratio) was used as the electrolyte.

The secondary battery prepared as described above was subjected to a formation charging and discharging (charging condition CC-CV 0.1C 3.8V 0.05C CUT-OFF, discharging condition CC 0.1C 2.5V CUT-OFF).

Experimental Example

Evaluation Example 1: Powder Targeted Evaluation (1) Measurement of Crystallite Size in the Crystallographic Plane (020) Direction (Lp(020)) and Crystallite Size Ratio (Lp(020)/Lp(200))—Lithium Metal Phosphate Particles An XRD analysis was performed on the lithium metal phosphate particles (in a powder state) prepared according to the above-described Examples and Comparative Examples, and the crystallite size in the crystallographic plane (020) direction (Lp(020)) and the crystallite size in the crystallographic plane (200) direction (Lp(200)) of the lithium metal phosphate particles were calculated using Equations 1 and 3 described above.

The crystallite size ratio was calculated by substituting the calculated Lp(020) and Lp(200) into Equation 2 described above.

Specific XRD analysis equipment/conditions are as shown in Table 1 below.

TABLE 1

| XRD(X-Ray Diffractometer) EMPYREAN | |
|---|---|
| Maker | PANalytical |
| Anode material | Cu |
| K-Alpha1 wavelength | 1.540598 Å |
| Generator voltage | 45 kV |
| Tube current | 40 mA |
| Scan Range | 10~120° |
| Scan Step Size | 0.0065° |
| Divergence slit | ¼° |
| Antiscatter slit | ½° |

(2) Evaluation on Low Temperature Power Property

The lithium secondary battery prepared according to each of Examples and Comparative Examples was placed in a −7° C. chamber and left for 12 hours, and then a low-temperature discharge capacity (mAh/g) was measured.

The lithium secondary battery was left at room temperature (25° C.) for 12 hours, and then a room temperature discharge capacity (mAh/g) was measured.

The measured low-temperature discharge capacity was divided by the room-temperature discharge capacity, and calculated as a percentage.

(3) Evaluation on Low-Temperature Energy Density Retention

The lithium secondary battery prepared according to each of Examples and Comparative Examples was placed in a −7° C. chamber and left for 12 hours, and then a low-temperature energy density (Wh/kg) was measured.

The lithium secondary battery was left at room temperature (25° C.) for 12 hours, and then a room temperature energy density (Wh/kg) was measured.

The measured low-temperature energy density was divided by the room temperature energy density, and calculated as a percentage.

The calculation and evaluation results are shown in Table 2 below.

TABLE 2

| No. | Lp(020) (nm) | Lp(020)/ Lp(200) | low temperature power property (%) | low temperature energy density (%) |
|---|---|---|---|---|
| Example 1 | 293 | 0.99 | 67.8 | 67.2 |
| Example 2 | 310 | 0.94 | 68.2 | 67.5 |
| Example 3 | 325 | 0.92 | 68.0 | 66.4 |
| Example 4 | 302 | 0.85 | 70.1 | 69.7 |
| Example 5 | 335 | 1.04 | 58.1 | 57.4 |
| Example 6 | 388 | 1.09 | 60.2 | 59.3 |
| Comparative Example 1 | 470 | 0.97 | 40.2 | 39.4 |
| Comparative Example 2 | 482 | 0.99 | 44.2 | 38.1 |
| Comparative Example 3 | 455 | 0.99 | 48.5 | 48.4 |
| Comparative Example 4 | 462 | 1.02 | 46.3 | 44.1 |

Referring to Table 2, in Examples where the crystallite sizes of the lithium metal phosphate particles in the crystallographic plane (020) direction as measured by the XRD analysis were within a range from 150 nm to 450 nm, the low-temperature power properties and the low-temperature energy density were improved compared to those from Comparative Examples.

In Examples 5 and 6 where the crystallite size ratio exceeded 1, the low-temperature discharge capacity and the low-temperature energy density were relatively lowered compared to those from other Examples.

Evaluation Example 2—Electrode Targeted Evaluation

(1) Examples 7 to 14

An XRD analysis was performed on the cathode active material layer of the prepared cathode. The cathodes having the crystallite size and the electrode crystallite size ratio values as shown in Table 3 were selected based on the XRD analysis results and used as the cathodes according to Examples 7 to 14. A lithium secondary battery was manufactured by the same method as in Example 1 except that the selected cathode was used.

(2) Measurement of Crystallite Size in the Crystallographic Plane (020) Direction of Electrode (Le(020)) and Crystallite Size Ratio (Le(020)/Le(200))

An XRD analysis was performed on the cathode active material layer (in an electrode state) included in the cathode manufactured according to each of Examples and Comparative Examples, and the crystallite size in the crystallographic plane (020) direction (Le(020)) and the crystallite size in the crystallographic plane (200) direction (Le(200)) were calculated using Equations 5 and 6 as described above.

The calculated Le(020) and Le(200) were substituted into Equation 4 to calculate the electrode crystallite size ratio.

Specific XRD analysis equipment/conditions are as described in Table 1.

(3) Evaluation of Low-Temperature Power Property and Low-Temperature Energy Density Retention Low-temperature power property and low-temperature energy density retention were evaluated by the same methods as those described in the above (2) and (3) of Evaluation Example 1.

The evaluation results are shown in Table 3 below.

TABLE 3

| No. | Le(020) (nm) | Le(020)/Le(200) | low temperature power property (%) | low temperature energy density (%) |
| --- | --- | --- | --- | --- |
| Example 7 | 124 | 0.87 | 68.0 | 67.4 |
| Example 8 | 138 | 0.79 | 68.2 | 67.1 |
| Example 9 | 280 | 0.68 | 68.4 | 66.5 |
| Example 10 | 368 | 0.57 | 68.1 | 68.1 |
| Example 11 | 116 | 0.90 | 63.3 | 60.0 |
| Example 12 | 373 | 0.52 | 66.5 | 64.3 |
| Example 13 | 120 | 0.92 | 58.2 | 57.9 |
| Example 14 | 369 | 0.49 | 65.4 | 63.7 |

Referring to Tables 2 and 3, in Examples 7 to 10, the low-temperature power property and the low-temperature energy density were improved compared to those from Comparative Examples.

Referring to Table 3, in Examples 11 and 12 where the crystallite size in the crystallographic plane (020) direction was less than 120 nm or greater than 370 nm, the low-temperature power property and the low-temperature energy density were relatively lowered compared to those from Examples 7 to 10.

In Examples 13 and 14 where the electrode crystallite size ratio was less than 0.5 or greater than 0.9, the low-temperature power property and the low-temperature energy density were relatively lowered compared to those from Examples 7 to 10.

The disclosed technology can be implemented in rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the disclosed technology can be implemented in some embodiments to provide improved electrochemical devices such as a battery used in various power sources and power supplies, thereby mitigating climate changes in connection with uses of power sources and power supplies. Lithium secondary batteries based on the disclosed technology can be used to address various adverse effects such as air pollution and greenhouse emissions by powering electric vehicles (EVs) as alternatives to vehicles using fossil fuel-based engines and by providing battery-based energy storage systems (ESSs) to store renewable energy such as solar power and wind power.

Only specific examples of implementations of certain embodiments are described. Variations, improvements and enhancements of the disclosed embodiments and other embodiments may be made based on the disclosure of this patent document.

What is claimed is:

1. A cathode active material for a lithium secondary battery comprising a lithium metal phosphate particle having a crystallite size in a range from 150 nm to 450 nm in a direction of a crystallographic plane (020) as measured by an X-ray diffraction (XRD) analysis, wherein a particle crystallite size ratio determined by Equation 2 based on a measurement by the XRD analysis is greater than 0 and less than 1:

particle crystallite size ratio=$Lp(020)/Lp(200)$ [Equation 2]

wherein, in Equation 2, Lp(020) is a value in nm corresponding to the crystallite size in the direction of the crystallographic plane (020) of the lithium metal phosphate particle, and Lp(200) is a value in nm corresponding to a crystallite size in a direction of a crystallographic plane (020) of the lithium metal phosphate particle.

2. The cathode active material according to claim 1, wherein the crystallite size of the lithium metal phosphate particle in the direction of the crystallographic plane (020) is in a range from 250 nm to 400 nm.

3. The cathode active material according to claim 1, wherein the crystallite size of the lithium metal phosphate particle in the direction of the crystallographic plane (020) is measured using Equation 1:

$$Lp(020) = \frac{0.9\lambda}{\beta\cos\theta}$$ [Equation 1]

wherein, in Equation 1, Lp(020) is a value in nm corresponding to the crystallite size of the lithium metal phosphate particle in the direction of the crystallographic plane (020), $\lambda$ is a value in nm corresponding to an X-ray wavelength used in the XRD analysis, $\beta$ is a value in rad indicating a full width at half maximum of a peak corresponding to the crystallographic plane (020), and $\theta$ is a diffraction angle in rad.

4. The cathode active material according to claim 1, wherein Lp(200) of Equation 2 is measured using Equation 3:

$$Lp(200) = \frac{0.9\lambda}{\beta\cos\theta}$$ [Equation 3]

wherein, in Equation 3, Lp(200) is the value in nm corresponding to the crystallite size of the lithium metal phosphate particle in the direction of the crystallographic plane (020), λ is a value in nm corresponding to an X-ray wavelength used in the XRD analysis, β is a value in rad indicating a full width at half maximum of a peak corresponding to the crystallographic plane (020), and θ is a diffraction angle in rad.

5. The cathode active material according to claim 1, wherein the particle crystallite size ratio is in a range from 0.80 to 0.99.

6. The cathode active material according to claim 1, wherein the lithium metal phosphate particle includes an olivine crystal structure represented by Chemical Formula 1:

$$Li_aM_xP_yO_{4+z}$$ [Chemical Formula 1]

wherein, in Chemical Formula 1, 0.9≤a≤1.2, 0.99≤x≤1.01, 0.9≤y≤1.2, −0.1≤z≤0.1, and M includes at least one of Fe, Co, Ni, or Mn.

7. The cathode active material according to claim 1, wherein the lithium metal phosphate particle further includes a doping element or a coating element, and
the doping element or the coating element includes at least one of Na, Mg, Ca, Y, Ti, Hf, V, Nb, Ta, Cr, Mo, W, Fe, Cu, Ag, Zn, B, Al, Ga, C, Si, Sn, Sr, Ba, Ra, P, or Zr.

8. The cathode active material according to claim 1, wherein the lithium metal phosphate particle further includes a carbon coating formed on a surface of the lithium metal phosphate particle.

9. The cathode active material according to claim 1, wherein the direction of the crystallographic plane (020) of the lithium metal phosphate particle is a direction in which lithium ions are diffused or transferred.

10. A lithium secondary battery, comprising:
a cathode comprising a cathode active material layer that includes a cathode active material for a lithium secondary battery; and
an anode facing the cathode,
wherein an electrode crystallite size ratio determined by Equation 4 is in a range from 0.5 to 0.9:

electrode crystallite size ratio=Le(020)/Le(200)   [Equation 4]

wherein, in Equation 4, Le(020) is a value in nm corresponding to a crystallite size in a direction of a crystallographic plane (020) measured by an XRD analysis on the cathode active material layer, and Le(200) is a value in nm corresponding to a crystallite size in a direction of a direction of a crystallographic plane (020) measured by the XRD analysis on the cathode active material layer.

11. The lithium secondary battery according to claim 10, wherein Le(020) in Equation 4 is measured using Equation 5, and Le(200) in Equation 4 is measured using Equation 6:

$$Le(020) = \frac{0.9\lambda}{\beta\cos\theta}$$ [Equation 5]

$$Le(200) = \frac{0.9\lambda}{\beta\cos\theta}$$ [Equation 6]

wherein, in Equation 5, Le(020) is the value in nm corresponding to a crystallite grain size in the direction of the crystallographic plane (020) measured by the XRD analysis on the cathode active material layer, λ is a value in nm corresponding to an X-ray wavelength, β is a value in rad indicating a full width at half maximum of a peak corresponding to the crystallographic plane (020) measured by the XRD analysis on the cathode active material layer, and θ is a diffraction angle (rad), wherein, in Equation 6, Le(200) is the crystallite grain size (nm) in the direction of the crystallographic plane (200) measured by the XRD analysis on the cathode active material layer, λ is an X-ray wavelength (nm), β is a full width at half maximum (rad) of a peak corresponding to the crystallographic plane (200) measured by the XRD analysis on the cathode active material layer, and θ is a diffraction angle in rad.

12. The lithium secondary battery according to claim 10, wherein Le(020) in Equation 4 is in a range from 120 nm to 370 nm.

* * * * *

UNITED STATES PATENT AND TRADEMARK OFFICE
CERTIFICATE OF CORRECTION

PATENT NO. : 12,113,217 B2
APPLICATION NO. : 18/501932
DATED : October 8, 2024
INVENTOR(S) : Ji Yae Do et al.

Page 1 of 1

It is certified that error appears in the above-identified patent and that said Letters Patent is hereby corrected as shown below:

In the Specification
In Column 2, Line 9, delete "crystallographic plane (020)" and insert --crystallographic plane (200)--

In the Claims
In Claim 1, Column 14, Line 37, delete "(020)" and insert --(200)--
In Claim 4, Column 15, Line 4, delete "(020)," and insert --(200),--
In Claim 4, Column 15, Line 7, delete "(020)," and insert --(200),--
In Claim 10, Column 16, Line 6, delete "crystallographic plane (020)" and insert --crystallographic plane (200)--

Signed and Sealed this
Eleventh Day of November, 2025

John A. Squires
*Director of the United States Patent and Trademark Office*